Nov. 10, 1959  H. O. KRON ET AL  2,912,087
VALVE CONTROL APPARATUS
Filed April 21, 1958  3 Sheets-Sheet 3

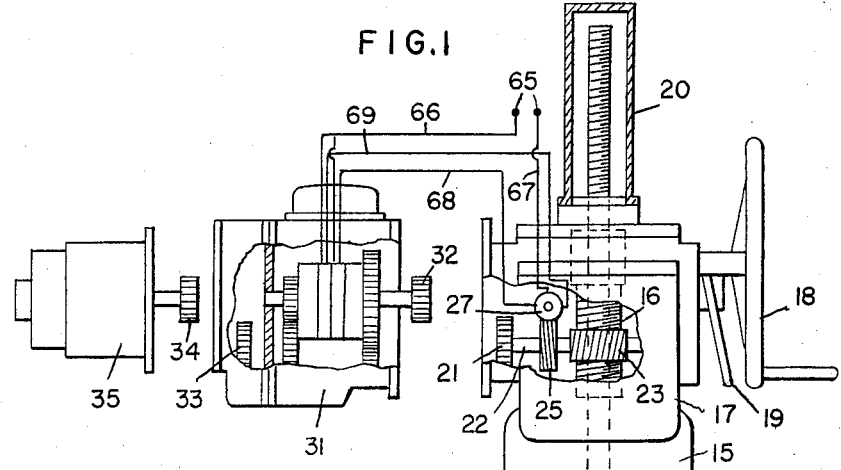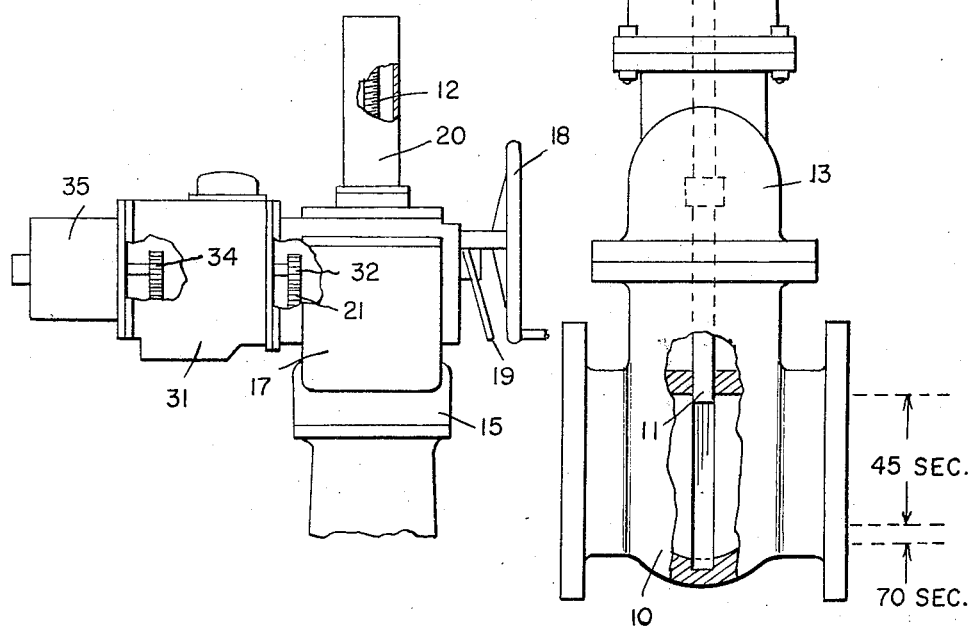

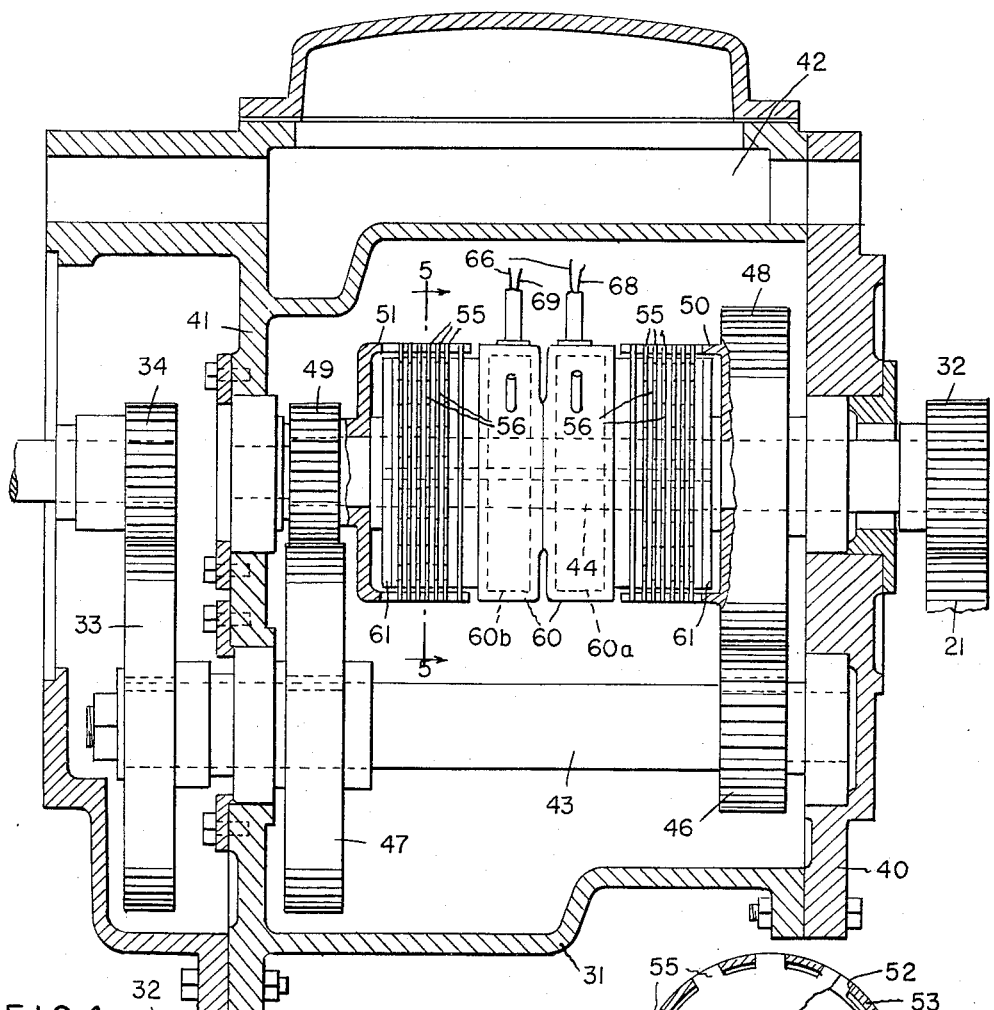

INVENTORS
Harold O. Kron
BY Walter J. Denkowski

ATTY

2,912,087
VALVE CONTROL APPARATUS

Harold O. Kron, Philadelphia, and Walter J. Denkowski, Huntingdon Valley, Pa., assignors to Philadelphia Gear Corporation, a corporation of Pennsylvania Application April 21, 1958, Serial No. 729,828

3 Claims. (Cl. 192—48)

The present invention relates to a valve control apparatus and more particularly to a power actuated device for controlling all types of valve mechanisms wherein the opening and closing movements of the valve are inititated by push button operation and stopped automatically by suitable limit stop devices.

The use of such power actuated valve control mechanism eliminates the need for personnel to manually operate the valves and substantially increases the speed with which valve operations may be effected. This type of mechanism provides fully automatic operation where desired, and is particularly suitable for use where valves are inaccessibly located or where emergency may require rapid, positive operation from a remote point. The present invention may be fitted to any size valve in almost any position or location and can readily be adapted to existing equipment.

The present invention is especially adapted for use with relatively large power actuated valves in long pipe lines carrying fluids such as water, oil, gas and the like. In such applications, a surge pressure problem is encountered which is sometimes also termed the water hammer problem or the hammer blow problem depending on the particular type of fluid being carried in the pipes. This surge problem arises when conventional power actuated valves close at the usual rapid rate thereby causing a sudden and dangerous surge or rise in pressure to develop in the pipe at the inflow side of the valve producing an effect similar to a hammer blow. This phenomenon is explained by the fact that the mass of fluid in forward motion in the pipe if brought to a more or less sudden halt by the rapid closing of the valve exerts its momentum or impact upon the valve and upon the associated pipe walls, and may even cause a reaction at the pumping station. Hence, the faster the valve closes, the more sudden the motion of the fluid mass is brought to a stop, and consequently the greater is the momentum, impact, and resultant pressure surge.

The development of the surge pressure within the pipes may assume varying characteristics depending on the speed of closing of the valve as well as the local structural factors such as pipe diameter and the extent of free length of pipe before and after the valve. For example, under one set of conditions, the pressure may not rise appreciably until the valve is in the last 10% of its closing movement whereupon the pressure rises sharply and reaches dangerous proportions. In usual applications, the pressure surge is likely to attain a sudden maximum during the final phase of the closing movement of the valve and often reaches dangerously high proportions which damage the pipe or valve, or even the pumping station.

It is common practice in the prior art to provide surge pressure responsive relief systems comprising automatic relief valves, check valves, additional piping, and storage facilities for fluid that is allowed to escape from the pipe to prevent excessive surge pressure. Of course, such additional structure as employed in conventional power actuated systems adds greatly to the expense and complexity of such systems and increases the maintenance problems associated therewith.

While the invention is suitable for use with any type of valve, the invention will hereinafter be described for convenience as associated with a gate type of valve which is opened and closed by the non-rotating but axial or linear movement of a threaded valve stem or spindle moving in a power rotated sleeve-like nut which is constrained from movement in an axial or linear direction.

The power rotated nut of the valve mechanism is driven by a gear train mounted within a suitable casing, and a motor unit is supported from the casing, a gear box being interposed between the casing and the motor unit and containing therein a change speed apparatus for controlling the speed of movement of the valve member. The apparatus may be actuated by conventional remote control push button mechanism for commencing an operating cycle of the valve in either the opening or closing direction. Limit stop mechanism is provided for terminating the operating cycle and stopping the valve in either open or closed position. A switch is connected to the drive means of the apparatus and controls the operation of the change speed apparatus such that the speed of movement of the valve is relatively high during the initial portion of the closing movement of the valve member and is considerably less during the final portion and during seating of the valve. During the opening movement of the valve, the initial speed of movement thereof is again low, and then subsequently considerably increased during the remaining portion of the opening movement.

The change speed apparatus housed within the gear box of the present invention includes a driven shaft and a countershaft journalled in parallel relationship within the gear box. The countershaft has an input gear fixed thereto which meshes with an output gear connected to the motor unit, and the driven shaft has an output gear fixed thereto which meshes with an input gear of the gear train within the aforementioned casing. A relatively small gear and a relatively large gear are rotatably fixed to the countershaft in spaced relationship to one another, and mesh respectively with a relatively large gear and a relatively small gear rotatably journalled on the driven shaft in spaced relationship to one another.

Each of the gears journalled on the driven shaft has a substantially annular portion fixed thereto, each of the portions surrounding the driven shaft in spaced relation thereto and having the open end portions thereof facing one another. A pair of electrically operated clutches are provided for selectively clutching the annular portions and accordingly the gears to the driven shaft. Each of the clutches includes a movable armature encircling the driven shaft and a non-rotatable coil disposed in surrounding relation thereto. The energization of the clutch coils is controlled by the switch means in timed relation to movement of the valve such that the clutch associated with the smaller gear on the driven shaft is engaged during the initial closing movement of the valve thereby providing rapid movement of the valve, and at a predetermed point, this clutch is disengaged, and the other clutch associated with the larger gear on the driven shaft is engaged to provide slow movement of the valve.

The initial relatively slow opening movement of the valve also provides increased power for opening the valve, thereby substantially eliminating the possibility of the valve sticking in seated position. The change speed mechanism of the present invention is incorporated in a gear box which may be attached to present power actuated valve apparatus in a simple and expeditious manner. The aforedescribed rates of opening and closing movement of the valve member substantially eliminate the surge problem encountered with prior art structures and thereby avoids the necessity of providing additional surge pressure responsive relief systems.

In the preferred embodiment of the present invention, the device is provided with a fail-safe mechanism which normally urges the low speed clutch into engagement and the high speed clutch out of engagement so that upon a power failure which would cause the electromagnetic clutches of the device to become inoperative, the change speed apparatus is automatically shifted into low speed position.

This fail-safe mode of operation is accomplished by providing a first spring member normally urging the armature of the low speed clutch into engagement with the associated clutch discs, and a second spring member provided which normally urges the armature of the high speed clutch away from the associated clutch discs to thereby disengage the high speed clutch. In this modification, the coils of the two clutches are energized simultaneously thereby disengaging the low speed clutch and engaging the high speed clutch.

An object of the present invention is to provide a new and novel valve control apparatus which avoids the need of providing special surge pressure responsive relief systems in association with a power actuated valve.

Another object of the invention is the provision of a valve control apparatus which provides increased initial power for opening the valve.

A further object is to provide an attachment whereby existing power actuated valve units installed in the field can be converted into variable speed units for the purpose of this invention.

Yet another object is the provision of a valve control apparatus which is simple and inexpensive in construction, yet efficient and reliable in operation.

A still further object of the invention is to provide a fail-safe mechanism whereby the change speed apparatus will always be in low speed position upon failure of power to the clutches.

Other objects and many of the attendant advantages of the present invention will become more apparent when considered in connection with the following specification and accompanying drawings wherein:

Fig. 1 is a general somewhat schematic view partly broken away of a gate valve unit embodying the invention with some of the components in exploded position to illustrate the manner of assembly thereof;

Fig. 2 is a view of a portion of the unit shown in Fig. 1 in assembled position;

Fig. 3 is a longitudinal section through the gear box of the present invention;

Fig. 4 is an enlarged view illustrating the manner of connection of the switch to the control means of the apparatus;

Fig. 5 is a sectional view taken on line 5—5 of Fig. 3 looking in the direction of the arrows;

Figure 6:
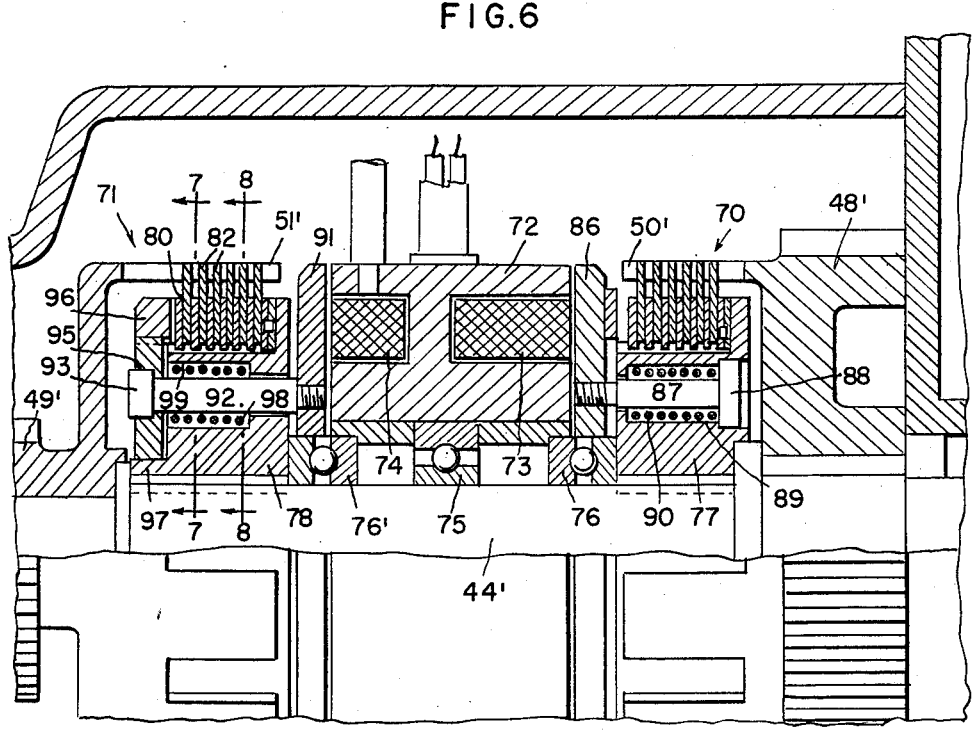
Fig. 6 is a view similar to Fig. 3 illustrating a preferred embodiment of the apparatus.

Referring now to the drawings wherein like reference characters illustrate corresponding parts throughout the several views, there is shown in Figs. 1 and 2 a power actuated gate valve unit comprising a valve body 10 having a valve member 11 slidably mounted therein for lateral movement between open and closed positions, the valve member being secured to a spindle 12. A hood 13 is secured to the upper portion of valve body 10, and an intermediate body member 14 supports a casing 15. The upper portion of spindle 12 is threaded and engages a sleeve-like nut 16 rotatably journalled within casing 15, but constrained against axial movement. The unit has conventional limit switch devices for automatically stopping the motor unit at the end of the opening and closing movements of the valve member, such limit switch devices being indicated by a switch box 17. The usual stand-by mechanism for actuating the spindle is in the form of a hand wheel 18 and a declutching handle 19 which prevents rotation of the hand wheel during power operation.

The upper portion of the spindle extends within an upwardly extending housing 20 secured to the casing 15. A gear train is mounted within casing 15 including an input gear 21 fixed to one end of a worm shaft 22 rotatably mounted within the casing. The worm shaft has a worm (not visible in Fig. 1) meshing with a worm gear 23 which surrounds and is unitary with nut 16. As seen most clearly in Fig. 4, worm shaft 22 is also provided with an auxiliary worm 25 meshing with a gear 26 which serves to operate the movable member of an electric switch means 27 having output terminals 28 and 29 and an input terminal 30.

A gear box 31 has a change speed mechanism mounted therein including an output gear 32 adapted to mesh with input gear 21 of the gear train within casing 15 and also has an input gear 33 adapted to mesh with the output gear 34 of a motor unit 35 of conventional construction. The gear box 31 is adapted to be flange connected at opposite ends thereof to casing 15 and motor unit 35 respectively, and the unit is shown in assembled position in Fig. 2 whereby it is evident that the invention provides a compact structure and enables existing units to be easily converted to multi-speed operation.

Referring more particularly to Fig. 3, the details of the change speed apparatus are more clearly seen wherein the gear box 31 is provided with two opposite end walls 40 and 41 and a hollow conduit 42 is formed through the upper portion for receiving electric connections between the motor unit and the limit switches disposed within switch box 17 and other electric connections between control switch 27 and the coils of the electromagnetic clutches of the device.

A countershaft 43 and a driven shaft 44 are rotatably journalled within the gear box in spaced parallel relationship with one another, the countershaft having input gear 33 fixed to one end thereof, and driven shaft 44 having output gear 32 secured thereto. A relatively small gear 46 and a relatively large gear 47 are fixed to the countershaft and are spaced from one another. Gear 46 meshes with a relatively large gear 48 rotatably journalled on driven shaft 44, and gear 47 meshes with a relatively small gear 49 rotatably journalled on driven shaft 44 and spaced therefrom.

Gears 48 and 49 have fixed thereto laterally extending annular portions 50 and 51 respectively which are spaced outwardly from driven shaft 44 and have the inner facing end portions thereof spaced from one another. Annular portions 50 and 51 form oppositely facing substantially cup-shaped members the open ends of which face one another, and as seen most clearly in Fig. 5, each of annular portions 50 and 51 is provided with a plurality of longitudinally extending slots 52 extending between finger-like projections 53. A first plurality of clutch discs 54 is disposed within each of annular portions 50 and 51, and has a plurality of radially outwardly extending fingers 55 disposed within slots 52 thereby providing a driving connection between clutch discs 54 and annular portions 50 and 51, but permitting relative axial movement therebetween. A second plurality of clutch discs 56 is disposed within each of annular portions 50 and 51, clutch discs 54 and 56 being disposed in stacked relationship as is conventional in multiple disc clutches. Each of clutch discs 56 is provided with radially inwardly extending fingers 57 which, as seen most clearly in Fig. 5, are disposed within suitable longitudinal grooves 58 formed in the outer surface of clutch hubs 59 keyed to driven shaft 44 thereby providing a driving connection between clutch discs 56 and driven shaft 44 but permitting relative axial movement therebetween. Conventional resilient spring means is provided for normally urging clutch discs 54 and 56 of each clutch apart whereby the clutches are normally urged into disengaged position.

A pair of stationary housings 60 encircle driven shaft 44 and have mounted therein energizable coils 60a and 60b for actuating movable armatures 61 disposed in surrounding relationship to the driven shaft. Upon energization of coil 60a, gear 48 is clutched to the driven shaft, and the driven shaft will be driven at a relatively low speed. Upon energization of the coil designated 60b, gear 49 is clutched to the driven shaft, and the driven shaft will be driven at a speed substantially higher than that produced when gear 48 is clutched to the driven shaft.

An electric control circuit includes a pair of input terminals 65 shown in Fig. 1 connected to a suitable source of power and having one terminal connected to one side of the coils through a lead 66. The opposite terminal is connected through a lead 67 to switch 27, the switch closing a circuit through output terminal 28 thereof and lead 68 to coil 60a and through output terminal 29 thereof and lead 69 to coil 60b. The switch is connected to the drive means of the apparatus by means of gears 25 and 26 such that coil 60a is energized during the initial portion of the opening movement of the valve member, and coil 60b is energized during the remainder of the opening movement. In this manner, an increased force is applied to the valve member during the initial opening movement, and the valve is initially opened at a relatively slow speed. After the critical point has been passed in so far as the surge problem is concerned, the valve member is then moved rapidly into open position. Conversely, during the closing movement of the valve, the valve is initially moved rapidly toward closed position, and then closed slowly during the latter portion of its closing movement and during seating of the valve.

The switch 27 is so designed that it energizes only one coil at a time such that when one clutch is engaged the other end is disengaged during operation. Suitable provisions may be made for adjusting the position of the switch in relation to the cycle of the valve member for altering the point at which the clutches are engaged and disengaged. As seen in Fig. 1, a typical example of the time involved in movements of the valve at different speeds is illustrated at the lower right hand portion of the figure wherein the initial 90% of the closing movement of the valve member is at high speed requiring approximately 45 seconds and the remaining 10% of the closing movement of the valve member is at low speed requiring approximately 70 seconds. Of course, the opening movement is just the opposite of the aforementioned operation. An important advantage of the present invention is that whereas prior art apparatus requires large motors operating at a low gear ratio to provide high speed valve operation, the present invention employs considerably smaller valve operators taking advantage of the additional low speed ratio provided in the transmission of the present invention when maximum thrust is required.

Referring now to Fig. 6, a preferred embodiment of the change speed apparatus is illustrated wherein the clutches have been modified to provide a fail-safe mode of operation, and the remaining components of the apparatus are identical with those shown in Fig. 3, such components being given the same reference numerals primed. In the modification shown in Fig. 6, the low speed clutch is indicated generally by reference numeral 70, and the high speed clutch is illustrated generally by reference numeral 71. An annular body means 72 having mounted therein two coils 73 and 74 is supported on driven shaft 44' by means of radial bearing 75 and thrust bearings 76 and 76'.

Figure 7:
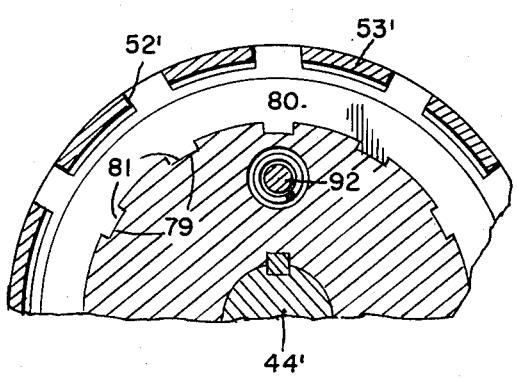
Fig. 7 is a sectional view taken along line 7—7 of Fig. 6 looking in the direction of the arrows.
Figure 8:
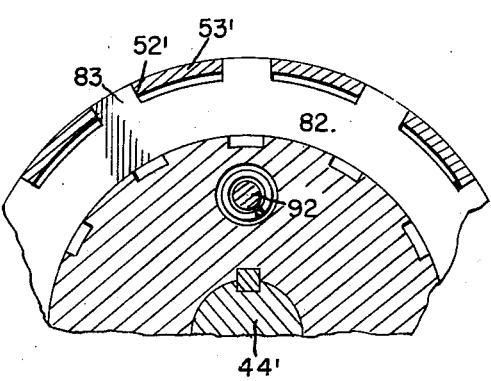
Fig. 8 is a sectional view taken on the line 8—8 of Fig. 6 looking in the direction of the arrows.

Clutch bodies 77 and 78 of the low and high speed clutches respectively are keyed to driven shaft 44', and as seen more clearly in Fig. 7, an outer surface of each of the clutch bodies is provided with similar longitudinal slots 79. A first plurality of clutch discs 80 are each provided with radially inwardly extending fingers 81 which are disposed within slots 79 in the clutch bodies 77 and 78 thereby providing a driving connection therebetween, but permitting relative axial movement therebetween. As seen most clearly in Fig. 8, annular portions 50' and 51' of gears 48' and 49' respectively are each provided with longitudinally extending slots 52' defined by longitudinally extending fingers 53' similar to the slots and fingers 52 and 53 of the device illustrated in Figs. 3 and 5. A second plurality of clutch discs 82 are disposed within each of annular portions 50' and 51', and are each provided with a radially outwardly extending finger 83 disposed within slots 52' of each of the annular portions for providing a driving connection, but permitting relative axial movement therebetween. Clutch discs 80 and 82 are disposed in stacked relationship in a conventional manner.

The armature 86 of the low speed clutch is slidably disposed on bearing 76 and has a stud 87 secured thereto having an enlarged head 88 formed on the outer end thereof. Stud 87 extends through a stepped opening 89 formed in clutch body 77, and a compression spring 90 is disposed within opening 89 and bears against enlarged head 88 for normally urging the armature toward the clutch discs thereby engaging the low speed clutch. The armature 91 of the high speed clutch has a stud 92 formed integral therewith having an enlarged head 93 formed on the outer end thereof. Stud 92 extends through a stepped opening 94 formed in the clutch body 78, and the outer end of the stud extends through a stepped opening 95 formed in a slidable member 96 journalled on a shoulder 97 formed on the clutch body 78. A compression spring 98 is disposed within stepped opening 94 and bears against slidable member 96 thereby normally urging the slidable member 96 away from the clutch discs to thereby normally disengage the high speed clutch.

It is evident from the foregoing description that the low speed clutch is normally engaged by compression spring 90 and the high speed clutch is normally disengaged by the compression spring 98 when coils 73 and 74 are de-energized. Switch 27 of the control means is adjusted such that coils 73 and 74 are normally de-energized during the initial portion of the opening movement of the valve member. Switch 27 closes the circuit through coils 73 and 74 during the latter portion of the opening movement of the valve member to thereby disengage the low speed clutch and engage the high speed clutch. In this manner, the initial portion of the opening movement of the valve member is at low speed and the remaining portion of the opening movement is at a substantially higher speed. If for any reason the source of power to the coils 73 and 74 should fail, the low speed clutch of the unit is automatically engaged since this is the safest position, and insures that the valve can be operated under conditions of electrical failure to the coils of the clutches.

While two modifications of the clutches employed in the present invention have been illustrated, it is evident that various other types of electrically operated clutches may be employed as desired.

It is apparent from the foregoing that there is provided a new and novel valve control apparatus which avoids the need of providing special surge pressure responsive relief systems in association with a power actuated valve and overcomes the difficulties encountered due to the surge problems in fluid carrying pipes. The apparatus provides increased initial power for opening the valve, and comprises an attachment whereby existing power actuated valve units installed in the field can be easily converted into variable speed units. The apparatus is simple and inexpensive in construction, yet efficient and reliable in operation. A fail-safe mechanism is provided which insures valve operation at safe low speed should there be an electric power failure in the clutches.

As this invention may be embodied in several form without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

We claim:

1. A speed change apparatus for use with a valve unit of the type having an openable and closable valve member and power actuated drive means for operating the valve member to open and to close it as well as for automatically stopping the movements of the valve member at the end of its opening and closing strokes, said speed change apparatus comprising a driven shaft, a low-speed gear, and a high-speed gear rotatably journalled on said driven shaft and spaced from one another, each of said gears having a laterally extending annular flange formed integrally therewith and disposed in spaced parallel relationship with said driven shaft, said flanges extending from said gears toward one another, a low-speed clutch body rotatably fixed to said driven shaft and mounted adjacent said low-speed gear, a high-speed clutch body rotatably fixed to said driven shaft and mounted adjacent said high-speed gear, a first plurality of clutch discs rotatably connected with the flange of said low-speed gear and slidable with respect thereto, a second plurality of clutch discs rotatably fixed to said low-speed clutch body and slidable with respect thereto, a first armature mounted in surrounding relationship to said driven shaft and being associated with said first and second plurality of clutch discs, resilient means normally urging said first armature toward said first and second clutch discs for maintaining said first and second clutch discs in clutched relationship, a third plurality of clutch discs rotatably fixed to the flange of said high-speed gear and slidable with respect thereto, a fourth plurality of clutch discs rotatably fixed to said high-speed clutch body and slidable with respect thereto, a second armature disposed in surrounding relationship to said driven shaft, a slidable member connected for movement with said second armature and resilient means normally urging said slidable member away from said third and fourth plurality of clutch discs for normally disengaging said third and fourth plurality of clutch discs, an annular body disposed in surrounding relationship to said driven shaft and spaced therefrom, said annular body being non-rotatably mounted in fixed relationship, a pair of coils supported by said annular body, each of said coils being disposed adjacent one of said armatures whereby upon energization of said coils, said armatures are attracted toward said annular body against the action of said resilient means.

2. Apparatus as defined in claim 1, wherein the flanges on said gears are disposed in surrounding relationship to the associated clutch bodies whereby the clutch bodies and the associated clutch discs are nested within the annular flanges, said annular body being disposed between the facing end portions of said flanges, said armatures being disposed between the associated flanges and the annular body thereby providing a very compact arrangement.

3. A speed change apparatus for use with a valve unit of the type having an openable and closable valve member and power actuated drive means for operating the valve member to open and to close it as well as for automatically stopping the movement of the valve member at the end of its opening and closing strokes, said change speed apparatus comprising a driven shaft, a low-speed gear and a high-speed gear rotatably journaled on said driven shaft and spaced from one another, said high-speed and said low-speed gears each having a substantially cup-shaped portion fixed thereto, said cup-shaped portions opening toward one another, a first plurality of clutch discs encircling said driven shaft and drivingly connected to the cup-shaped portion fixed to said low speed gear, said first plurality of clutch discs being enclosed by the associated cup-shaped portion, a second plurality of clutch discs encircling said driven shaft and being drivingly connected therewith and disposed adjacent said first plurality of clutch discs and being enclosed by the associated cup-shaped portion, a third plurality of clutch discs encircling said driven shaft and drivingly connected to the cup-shaped portion fixed to said high-speed gear, said third plurality of clutch discs being enclosed by the associated cup-shaped portion, a fourth plurality of clutch discs encirling said driven shaft and being drivingly connected therewith and disposed adjacent said third plurality of clutch discs and being enclosed by the associated cup-shaped portion, a stationary annular body means disposed in spaced surrounding relationship to said driven shaft, said body means being disposed between the facing end portions of said cup-shaped portions and spaced therefrom, a pair of energizable coils being supported by said body means and being disposed in surrounding relationship to said driven shaft, a first armature disposed in surrounding relationship to said driven shaft and slidable with respect thereto, said first armature being disposed between said body means and the end portion of the cup-shaped portion secured to said low-speed gear, a second armature disposed in surrounding relationship to said driven shaft and slidable with respect thereto, said second armature being disposed between said body means and the end portion of the cup-shaped portion secured to said high-speed gear, first resilient means normally urging said first armature toward clutch engaging position, second resilient means normally urging said second armature toward clutch disengaging position, said coils when energized urging said first armature to clutch disengaging position and said second armature to clutch engaging position.

References Cited in the file of this patent

UNITED STATES PATENTS

| | | |
|---|---|---|
| 2,209,776 | Kiekhaefer | July 30, 1940 |
| 2,629,264 | Kron | Feb. 24, 1953 |
| 2,816,454 | Hosea | Dec. 17, 1957 |